US010393294B2

(12) United States Patent
Ungchusri et al.

(10) Patent No.: US 10,393,294 B2
(45) Date of Patent: Aug. 27, 2019

(54) HAMMER UNION CONNECTION AND RELATED METHODS OF ASSEMBLY

(75) Inventors: Tep Ungchusri, The Woodlands, TX (US); Paul A. Crawford, Houston, TX (US); William H. Garner, Houston, TX (US); Alan R. Killingsworth, The Woodlands, TX (US); King F. Choi, Sugar Land, TX (US)

(73) Assignee: FMC Technologies, Inc., Houston, TX (US)

( * ) Notice: Subject to any disclaimer, the term of this patent is extended or adjusted under 35 U.S.C. 154(b) by 168 days.

(21) Appl. No.: 14/427,222

(22) PCT Filed: Sep. 13, 2012

(86) PCT No.: PCT/US2012/055208
§ 371 (c)(1), (2), (4) Date: Mar. 10, 2015

(87) PCT Pub. No.: WO2014/042643
PCT Pub. Date: Mar. 20, 2014

(65) Prior Publication Data
US 2015/0226355 A1 Aug. 13, 2015

(51) Int. Cl.
*F16L 19/02* (2006.01)

(52) U.S. Cl.
CPC ....... *F16L 19/0218* (2013.01); *F16L 19/0231* (2013.01); *Y10T 29/49826* (2015.01)

(58) Field of Classification Search
CPC .................................................. F16L 19/0231
See application file for complete search history.

(56) References Cited

U.S. PATENT DOCUMENTS 904,673 A * 11/1908 Bideker .............. F16L 27/0812 137/801
2,067,773 A * 1/1937 Long .................. F16L 19/0206 285/332

(Continued)

FOREIGN PATENT DOCUMENTS

CA 2690777 A1 7/2010

OTHER PUBLICATIONS

Office Action issued in European Application No. 12768952.9; dated Sep. 19, 2016 (4 pages).

(Continued)

*Primary Examiner* — Jacob J Cigna
(74) *Attorney, Agent, or Firm* — Osha Liang LLP

(57) ABSTRACT

A hammer union (100) includes a male sub (102), a threaded female sub (104), a threaded union nut (106) disposed around abutting ends of the threaded female sub and the male sub, the abutting ends of the threaded female sub and the male sub include contact surfaces (120, 122) perpendicular to a longitudinal axis (50) of the hammer union, and an outermost diameter of the perpendicular contact surfaces and a minor thread diameter of the female sub are equidistant from a longitudinal axis of the hammer union. A method of assembling a hammer union includes inserting a plurality of load segments (108) between a threaded union nut and a male sub, threadedly engaging internal threads of the threaded union nut with external threads (105) of a female sub, and engaging flat contact surfaces (120, 122) of abutting ends of the male sub and the female sub.

21 Claims, 7 Drawing Sheets

(56) References Cited

U.S. PATENT DOCUMENTS

| | | | | | |
|---|---|---|---|---|---|
| 2,780,483 | A * | 2/1957 | Kessler | F16L 19/0218 | 285/332.3 |
| 3,249,372 | A * | 5/1966 | Pollack | F16L 19/0212 | 277/622 |
| 3,635,499 | A * | 1/1972 | Reddy | F16L 17/073 | 277/625 |
| 4,458,926 | A * | 7/1984 | Williamson | F16L 19/025 | 285/332.3 |
| 4,801,160 | A * | 1/1989 | Barrington | F16L 19/005 | 285/110 |
| 4,802,695 | A * | 2/1989 | Weinhold | F16L 19/005 | 285/148.19 |
| 4,861,076 | A * | 8/1989 | Newman | F16L 19/0218 | 285/332.3 |
| 4,867,483 | A * | 9/1989 | Witt | F16L 19/0218 | 285/23 |
| 4,930,791 | A * | 6/1990 | Ungchusri | F16J 15/3256 | 277/607 |
| H000945 | H * | 8/1991 | Taliaferro | 285/288.5 | |
| 5,149,148 | A * | 9/1992 | Taeuber, Jr. | F16L 37/148 | 277/322 |
| 5,263,312 | A * | 11/1993 | Walker | F02C 7/25 | 285/13 |
| 5,725,259 | A * | 3/1998 | Dials | F16L 19/0225 | 285/334.4 |
| 6,598,908 | B1 * | 7/2003 | Wosik | F16L 19/055 | 285/332.3 |
| 6,899,358 | B2 * | 5/2005 | Richardson | F16L 19/0212 | 285/354 |
| 6,945,569 | B1 * | 9/2005 | Diaz | F16L 19/025 | 285/334.5 |
| 7,159,652 | B2 * | 1/2007 | McGuire | E21B 33/03 | 166/379 |
| 7,922,216 | B2 * | 4/2011 | Dallas | F16L 17/08 | 277/602 |
| 8,657,547 | B2 * | 2/2014 | Herndon | F16L 19/0231 | 411/432 |
| 8,833,804 | B2 * | 9/2014 | Myers | F16L 19/025 | 277/638 |
| 2004/0021319 | A1 | 2/2004 | Richardson et al. | | |
| 2005/0082829 | A1 | 4/2005 | Dallas | | |
| 2007/0063513 | A1 * | 3/2007 | Boyd | E21B 17/04 | 285/355 |
| 2009/0160186 | A1 | 6/2009 | McGuire | | |
| 2012/0126532 | A1 * | 5/2012 | Herndon | F16B 37/0892 | 285/81 |
| 2013/0072048 | A1 * | 3/2013 | Schafer | H01R 13/622 | 439/372 |

OTHER PUBLICATIONS

International Search Report issued in PCT/US2012/055208 dated Jun. 26, 2013 (2 pages).

Written Opinion of the International Searching Authority issued in PCT/US2012/055208 dated Jun. 26, 2013 (5 pages).

Examiner's Report issued in Canadian Patent Application No. 2,884,841; dated Mar. 18, 2016 (5 pages).

Examiner's Report issued in Canadian Patent Application No. 2,884,841; dated Jan. 31, 2017 (3 pages).

Office Action issued in Mexican Application No. MX/a/2015/003190; dated Oct. 13, 2017 with English letter reporting the same (11 pages).

Office Action issued in Mexican Application No. MX/a/2015/003190; dated Feb. 27, 2018 with English letter reporting the same (8 pages).

* cited by examiner

HAMMER UNION CONNECTION AND RELATED METHODS OF ASSEMBLY

BACKGROUND

Field of the Disclosure

Embodiments disclosed herein relate generally to the use of threaded unions, particularly so-called "hammer unions," and related methods of assembly.

Background Art

Threaded unions, particularly "hammer" unions, are commonly used in petroleum exploration and production to join conduits together, for example, conduits carrying high-pressure fluids such as drilling mud, fracturing fluids, and oil and gas produced incidental to drilling activities. Hammer unions are generally considered to be economical, simple, reliable, robust, and very easy to make-up and break-out quickly.

Typically, hammer unions are used more in temporary situations, such as joining together sections of joints (e.g., Chiksan® joints) used for pumping fracturing fluids into a wellbore under high pressure. Hammer unions may also be used in certain long-term applications for their ease of make-up and break-out, especially, for example, for equipment that may need to be replaced quickly and efficiently (e.g., rotary hoses for conveying drilling mud between a stand-pipe manifold and a rotary swivel or top drive, or components of a choke manifold, such as valves, chokes and spools, which may fail unexpectedly due to erosive flows).

Hammer unions typically include three major parts: a shouldered male sub, a threaded union nut, and a threaded female sub. The hammer union is typically made-up and broken-out by applying a sledge hammer to radial lugs on the threaded union nut. Referring now to FIG. 1, a cross-section view of a conventionally made-up hammer union with a spherical metal-to-metal pressure seal is shown. Threaded union nut 1 has hammer lugs 1A with internal threads 1B and flat surface 1C. Threaded union nut 1 bears on shoulder 2B on a distal end of shouldered male sub 2, which also has sealing surface 2C and outer diameter 5. Threaded female sub 3 has external threads 3A and sealing surface 3B.

Separation of hammer union connections under pressure due to metal fatigue is increasingly more common with increased flow rates and longer service lives. Fatigue fractures typically occur on the threaded union nut and female sub end, although they can occur in other regions as well. Accordingly, there exists a need for a hammer union connection that is more resistant to fatigue at higher flow rates and longer service life.

SUMMARY OF THE DISCLOSURE

In one aspect, embodiments disclosed herein relate to a hammer union including a male sub, a threaded female sub, a threaded union nut disposed around abutting ends of the threaded female sub and the male sub, wherein the abutting ends of the threaded female sub and the male sub include contact surfaces perpendicular to a longitudinal axis of the hammer union, and wherein an outermost diameter of the perpendicular contact surfaces and a minor thread diameter of the female sub are equidistant from a longitudinal axis of the hammer union.

In another aspect, embodiments disclosed herein relate to a method of assembling a hammer union including inserting a plurality of load segments between a threaded union nut and a male sub, threadedly engaging internal threads of the threaded union nut with external threads of a female sub, and engaging flat contact surfaces of abutting ends of the male sub and the female sub, wherein an outermost diameter of the flat contact surfaces and a minor thread diameter of the external threads of the female sub are equidistant from a longitudinal axis of the hammer union.

Other aspects and advantages of the invention will be apparent from the following description and the appended claims.

DETAILED DESCRIPTION

The following is directed to various exemplary embodiments of the disclosure. Embodiments disclosed should not be interpreted, or otherwise used, as limiting the scope of the disclosure, including the claims. In addition, those having ordinary skill in the art will appreciate that the following description has broad application, and the discussion of any embodiment is meant only to be exemplary of that embodiment, and not intended to suggest that the scope of the disclosure, including the claims, is limited to that embodiment. In one aspect, embodiments disclosed herein relate to a hammer union having features which make the hammer union more resistant to fatigue fractures and bending loads, and thus, stronger and more durable.

Figure 2A:
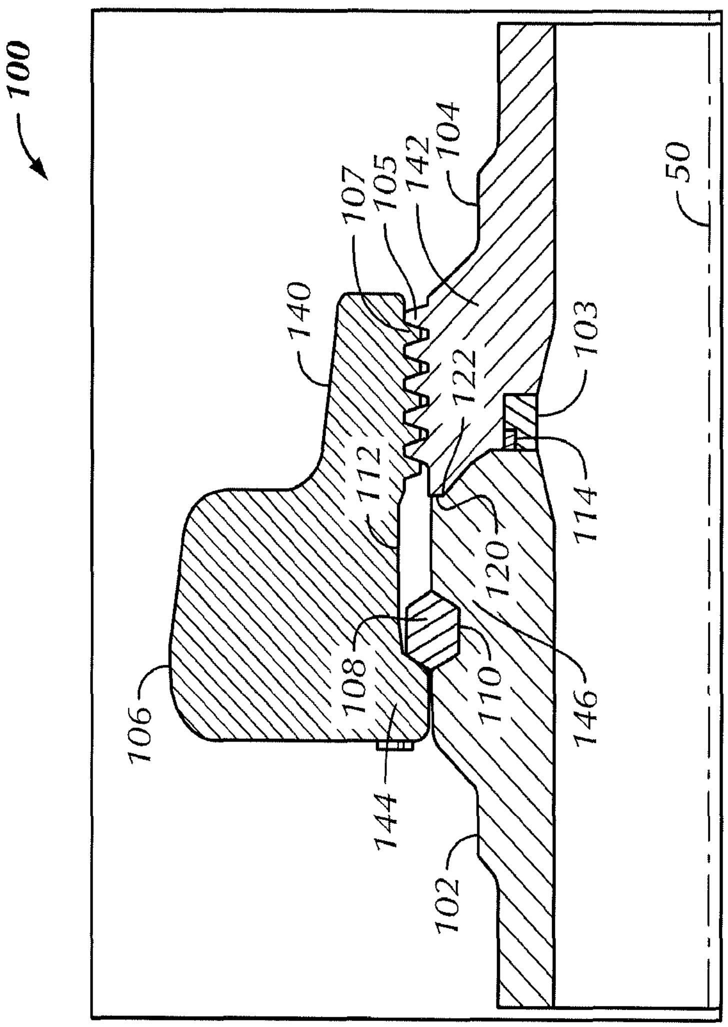
FIG. 2A shows a cross-sectional view of a hammer union connection in accordance with one or more embodiments of the present disclosure.

Referring now to FIG. 2A, a cross section view of a hammer union 100 in accordance with one or more embodiments of the present disclosure is shown. The hammer union includes a male sub 102, a threaded female sub 104, and a threaded union nut 106 that couples abutting ends of the male sub 102 and the threaded female sub 104. More particularly, the threaded female sub 104 includes outer threads 105 which are configured to engage inner threads 107 of the threaded union nut 106. The threaded union nut 106 and threaded female sub 104 may have any type of thread form used in hammer union connections as will be understood by one of ordinary skill in the art.

Figure 1:
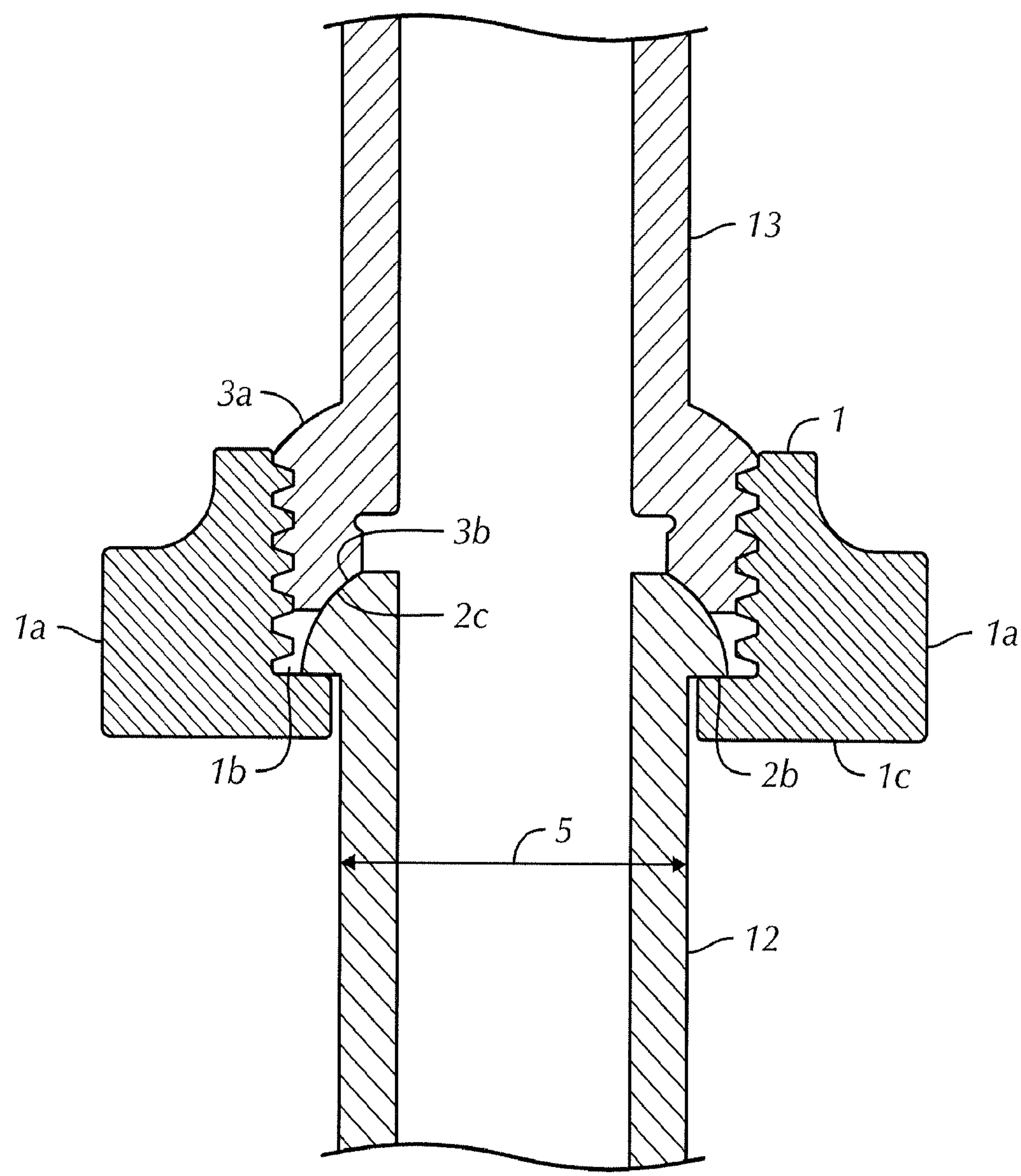
FIG. 1 shows a cross-sectional view of a conventional hammer union with a spherical metal-to-metal pressure seal.

Various regions of components of the hammer union 100 may have increased cross-sectional areas, particularly where fatigue cracks are likely to or typically occur. For example, any one of the male sub 102, threaded female sub 104, and threaded union nut 106 may have increased cross-sectional areas (i.e., added material or thicker components) in various regions. For example, the threaded union nut 106 may have an increased cross-sectional area in the neck down region 140 or the shoulder region 144 proximate the load segment groove 112. The female sub 104 may have an increased cross-sectional area in the lower threaded region 142. Furthermore, the male sub 102 may have an increased cross-sectional area in the abutment end region 146 proximate the load segment groove 110. For example, the width of the lower threaded region 142 of the female sub 104 from an outer diameter of seal 114 to the minor thread diameter of external thread 105, as shown in FIG. 2A, may be increased by 0.1 inch to 0.75 inch, e.g., 0.2 inch, 0.25 inch, 0.45 inch, over a corresponding width of female sub 3 of a conventional hammer union connection, as shown in FIG. 1. Similarly, the width of the abutment end region 146 of male sub 102 from an inner diameter of the male sub 102 to an inner diameter of load segment groove 110 may be increased by 0.1 inch to 0.75 inch, e.g., 0.2 inch, 0.25 inch, 0.45 inch, over a corresponding width of a male sub 2 of a conventional hammer union connection, as shown in FIG. 1.

Figure 2B:
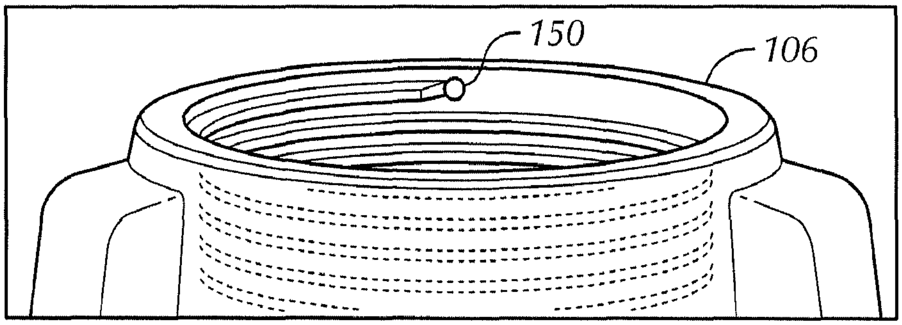
FIG. 2B shows a perspective view of a visual marker on a threaded union nut of the hammer union in accordance with one or more embodiments of the present disclosure.

Referring now briefly to FIG. 2B, a marker 150 on the threaded union nut 106 shows where the thread of the threaded union nut 106 starts. The marker 150 may help a user align the thread starts of the threaded union nut 106 and female sub 104. The marker 150 may be in the form of a "through-hole" extending from the inner surface of the threaded union nut 106 to the outer surface of the threaded union nut 106. The shape of the through-hole may vary, as long as it allows the user to visually see the location of the start of the thread on the threaded union nut 106 and to see the thread of the female sub 104 engage the thread of the threaded union nut 106. Methods to manufacture the through-hole include, but are not limited to drilling, countersinking, milling, and broaching. The shape of the physical mark 150 on the surface of the threaded union nut 106 may vary, as long as it is in close vicinity of the thread start. In other embodiments, the marker 150 may be a physical mark on the surface above the thread start of the threaded union nut 106. For example, the physical mark may be a notch formed on the surface above the thread start of the threaded union nut 106. The size and shape of the notch may vary. While the through-hole gives a visual method of making sure the two threads engage properly as compared to a physical mark on the surface, both types of marker 150 may serve to ease the thread start process.

Now referring back to the cross section view of the hammer union 100 in FIG. 2A, abutting ends of the male sub 102 and the threaded female sub 104 include corresponding flat contact surfaces 120 and 122, respectively, at an outermost portion of the male and female subs 102, 104. As used herein, "flat" contact surfaces are defined as contact surfaces that are substantially perpendicular to a longitudinal axis 50 of the hammer union 100. As shown, the contact surfaces 120 and 122 extend over a determined radial length of the abutting surfaces between male sub 102 and threaded female sub 104.

Further, an outer diameter of the flat contact surface 122 of the female sub 104 and a minor thread diameter of external thread 105 of the threaded female sub 104 may be radially equidistant from the longitudinal axis 50 of the hammer union 100. As used herein, "minor thread diameter" is defined as a diameter from root surface to root surface of external thread 105. In other embodiments, an outer diameter of contact surface 120 of the male sub 102 and a minor thread diameter of external thread 105 of female sub 104 may be radially equidistant from the longitudinal axis 50 of the hammer union 100. It should be understood that either or both contact surfaces 120 and 122 may be radially equidistant with a minor thread diameter of external thread 105 of the female sub 104. Moreover, the contact surfaces 120 and 122 may vary in radial length along abutting surfaces of the male sub 102 and the female sub 104. In certain embodiments, the flat contact surfaces 120 and 122 may be equal in length, while in other embodiments the contact surfaces 120 and 122 may have different lengths. Further, various profiles between abutting surfaces of the male sub 102 and the female sub 104 may be used, as will be understood by one of ordinary skill in the art.

When the hammer union connection is made up, flat contact points 120 and 122 of male sub 102 and threaded female sub 104, respectively, abut face to face. The increased contact surface diameter provided by contact surfaces 120 and 122 of the hammer union 100, having an outer diameter that is equidistant with a minor thread diameter of external threads 105, provides additional fatigue resistance from cyclic external bending loads.

Referring still to FIG. 2A, the hammer union 100 may include one or more load segments 108 disposed radially between the male sub 102 and the threaded union nut 106. More particularly, the male sub 102 may include a load segment groove 110 in an outer surface thereof and the threaded union nut 106 may include a load segment groove 112 in an inner surface thereof. As such, the one or more load segments 108 are disposed within load segment grooves 110 and 112 of the male sub 102 and threaded union nut 106, respectively. Alternatively, in place of load segments, the hammer union 100 may include one or more load shoulders (not shown) on either or both of the threaded union nut 106 and the male sub 102 which are configured to contact and are configured to withstand loads in a longitudinal direction when the hammer union connection is assembled.

Figure 2C:
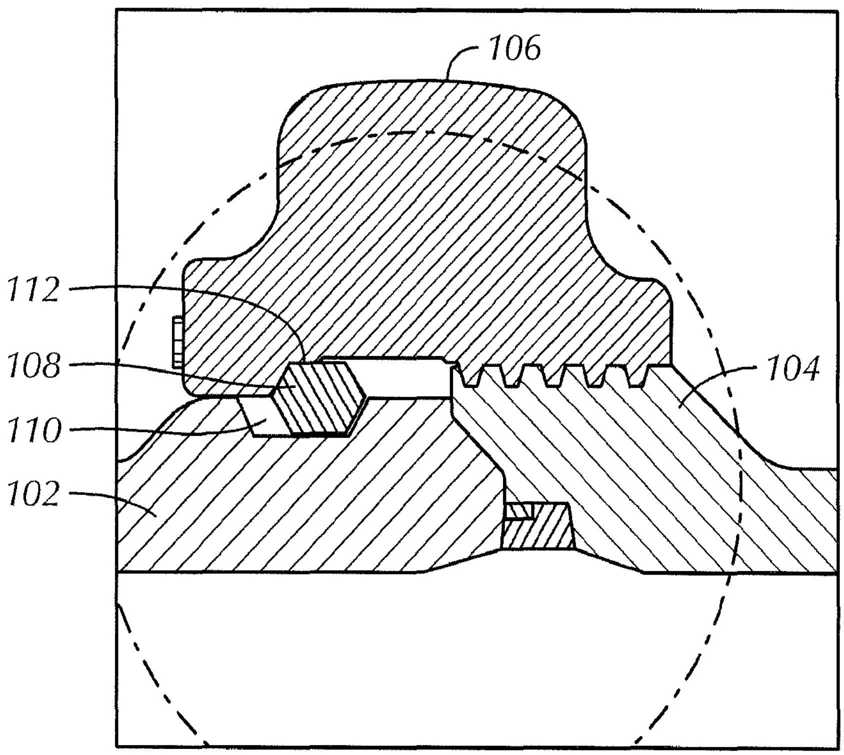
FIG. 2C shows a cross-sectional view of a hammer union connection in accordance with one or more embodiments of the present disclosure.
Figure 3A:
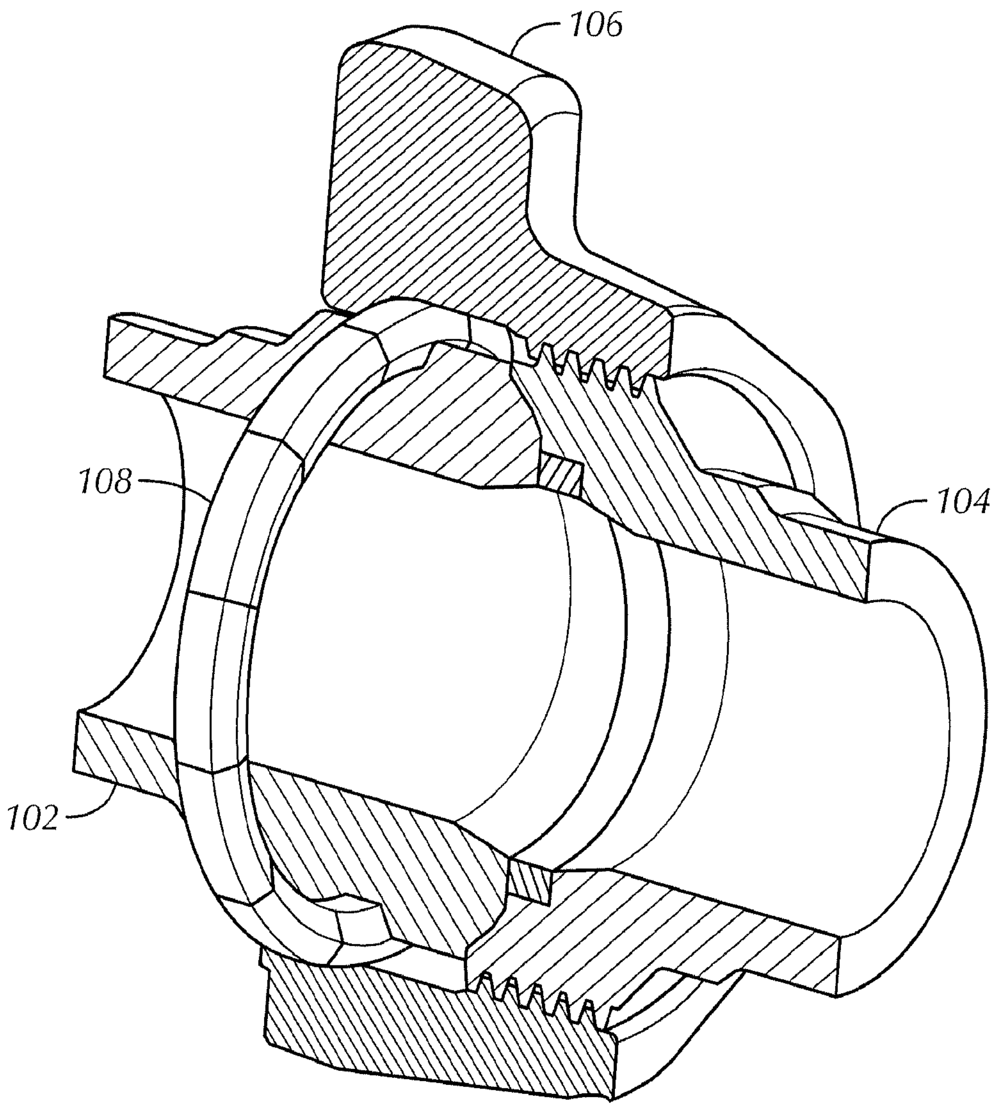
FIG. 3A shows a perspective cutaway view of load segments disposed within the hammer union connection of FIG. 2A in accordance with one or more embodiments of the present disclosure.

The load segments 108 are removable from load segment grooves 110 and 112 in the male sub 102 and threaded union nut 106, respectively. The axial lengths of the load segment grooves 110 and 112 may vary. For example, the load segment groove 112 in the threaded union nut 106 is typically greater in length than the load segment groove 110 in the male sub 102. In certain embodiments, a length of the load segment groove 112 of the threaded union nut 106 may be shortened and the load segment groove 110 of the male sub 102 lengthened, as shown in FIG. 2C. This, in turn, may allow for the threaded union nut 106 and male sub 102 to be shortened, thereby reducing weight of the hammer union 100. For example, the lengths of the threaded union nut 106 and the male sub 102 may be shortened by 0.1 inch to 1 inch, e.g., 0.25 inch, 0.5 inch, 0.75 inch. One of ordinary skill in the art will appreciate that a length of the load segment grooves 110 and 112 may be varied in any number of combinations of groove lengths. As shown in FIG. 3A, one or more load segments 108 may be disposed circumferentially between the male sub 102 and the threaded union nut 106.

Figure 3B:
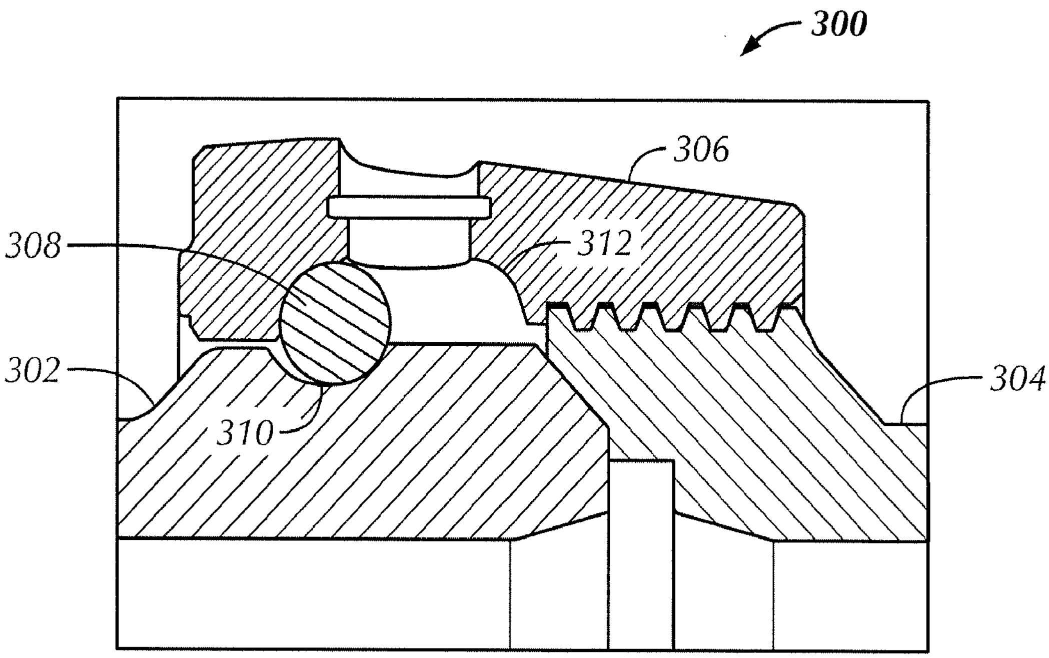
FIG. 3B shows a cross-sectional view of a load circular cross-section load segment within a hammer union connection in accordance with one or more embodiments of the present disclosure.

Load segments 108 having different shapes (i.e., different cross-sectional shapes) may be used, including but not limited to hexagonal (or any polygonal shape), circular, oblong or elliptical, and others, as will be understood by one of ordinary skill in the art. For example, FIG. 3B shows a hammer union 300 having a male sub 302, a female sub 304, a threaded union nut 306, and a load segment 308 with a circular cross section. As shown, load segment grooves 310, 312 of the male sub 302 and the threaded union nut 306, respectively, have a semi-circular profile to correspond with the circular cross-sectional shape of the load segment 308.

Load segments 108 may have an inner radius that is approximately equal to the outer radius of the male sub 102, and particularly the radius of the load segment groove 110, and an outer radius that is approximately equal to the inner radius of the threaded union nut 106, and particularly the radius of the load segment groove 112. Load segments having different circumferential lengths may be used. For example, in certain embodiments all load segments may have equal circumferential lengths. In other embodiments, load segments may have varying circumferential lengths. Still further, load segments 108 may also be made from a ring joint gasket that is cut into a set of load segments for each connection. Any number of different cross section ring joint gaskets may be used, as will by understood by one of ordinary skill in the art. The ring joint gaskets may be cut with water jets, lasers, or any other method known to one of ordinary skill in the art.

In some embodiments, the thread length on the female sub 104 and the thread length of the threaded union nut 106 may be increased. That is, the length of engaged threads between the female sub 104 and the threaded union nut 106 may be increased. For example, the length of engaged threads between the female sub 104 and the threaded union nut 106 may be increased by 0.1 inch to 1 inch, e.g., 0.2 inch, 0.4 inch, 0.7 inch, as compared to a length of engaged threads of a conventional female sub 3 and a conventional threaded union nut 1, as shown in FIG. 1. An increased engaged thread length may lower the shear stress and bending stresses of the threads, and increase the connection's resistance to fatigue.

Figure 4:
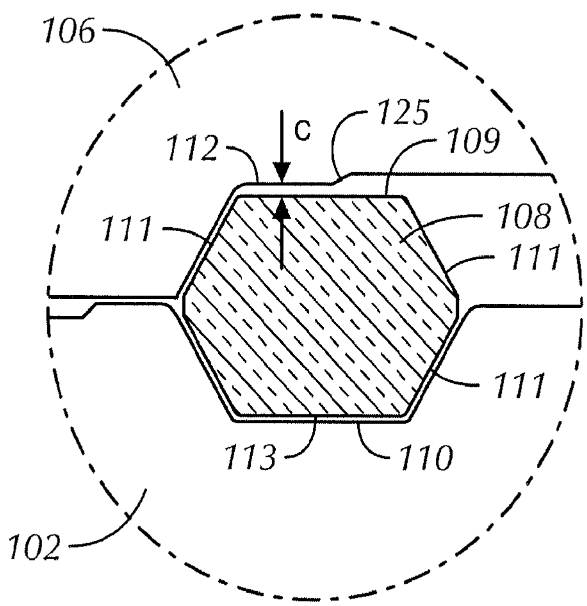
FIG. 4 shows a cross section view of a load segment disposed within the hammer union connection of FIG. 2A in accordance with one or more embodiments of the present disclosure.

Referring now to FIG. 4, an enlarged cross section view of a load segment 108 disposed in load segment grooves 110 and 112 of the male sub 102 and the threaded union nut 106, respectively, in accordance with one or more embodiments of the present disclosure is shown. As shown, a small amount of clearance "C" may exist between an outer flat surface 109 of the load segment 108 and a corresponding flat wall surface of the load segment groove 112 of the threaded union nut 106. For example, in certain embodiments, the amount of clearance "C" may be between about 0.01 and 0.05 inches. In other embodiments, the amount of clearance "C" may be about 0.025 inches. The clearance "C" may prevent sand and other fine debris from clogging up load segment grooves 110 and 112 where the load segments 108 sits. Due to the clearance "C," the outer flat surface 109 of the load segment 108 does not contact the corresponding flat surface of the load segment groove 112 of the threaded union nut 106.

Other diagonal faces 111 and an inner face 113 of the load segment 108 may also have slight clearances from corresponding walls of the load segments grooves 110 and 112. However, upon assembly, diagonal surfaces 111 and the inner surface 113 of the load segment 108 will contact corresponding surfaces of load segment grooves 110 and 112. A small axial ramp up 125 is formed in the load segment groove 112 of the threaded union nut 106 to provide flexibility when lining up the threaded union nut 106 with the female sub 104. The axial ramp up 125 allows for easy installation of the load segments 108 during connection makeup and provides a strong connection between the female sub 104, male sub 102, and threaded union nut 106 with evenly distributed loads. Once the threads of the threaded union nut 106 and the female sub 104 engage, the ramp up 125 will allow the load segments 108 to create contact load surfaces to transfer the loads from the female sub 104 to the threaded union nut 106.

Figure 5:
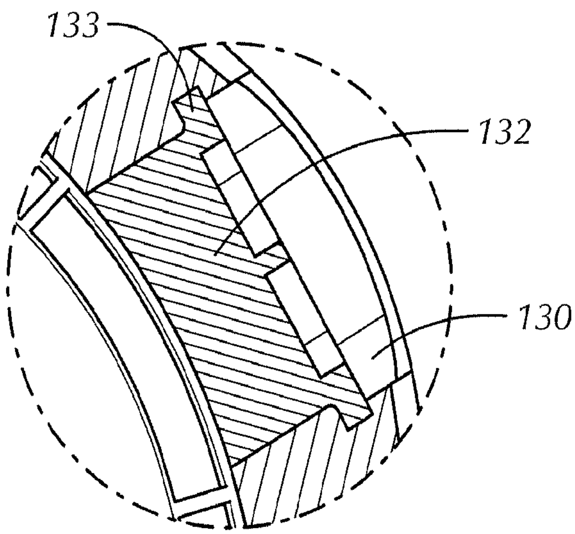
FIG. 5 shows an elastomeric plug in a port of a threaded union nut in accordance with one or more embodiments of the present disclosure.
Figure 6:
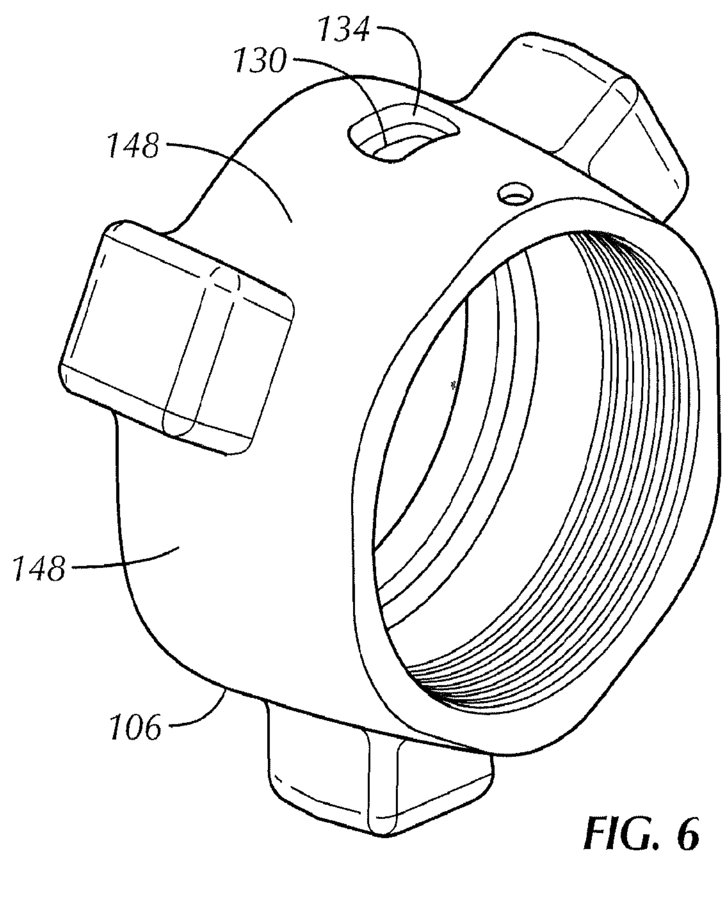
FIG. 6 shows a perspective view of a port in a threaded union nut and into which an elastomeric plug is installed in accordance with one or more embodiments of the present disclosure.

Load segments 108 are installed into the threaded union nut 106 through ports 130, as shown in FIG. 6. Ports 130 may have a profile similar to the circumferential profile of the load segments 108 for easy installation. To keep the load segments 108 in place, a plug 132 may be inserted into ports 130 of the threaded union nut 106, as shown in FIGS. 5 and 6. The plug material may be chosen such that the plug 132 is easily inserted while a retention mechanism on the female sub 104 will keep the plug 132 in place. One example of a retention mechanism includes a lip 133 on plug 132 that is larger in circumference or perimeter than the port entry 131, so that lip 133 on plug 132 snaps into groove 134 of port entry 130. Other methods may include the use of snap rings or clips that snap into groove 134 of port above the installed plug 132. The threaded union nut 106 may include reinforcement flutes 148 or other structural additions to provide additional strength to the threaded union nut 106, and in particular to the load segment port 130.

Figure 7:
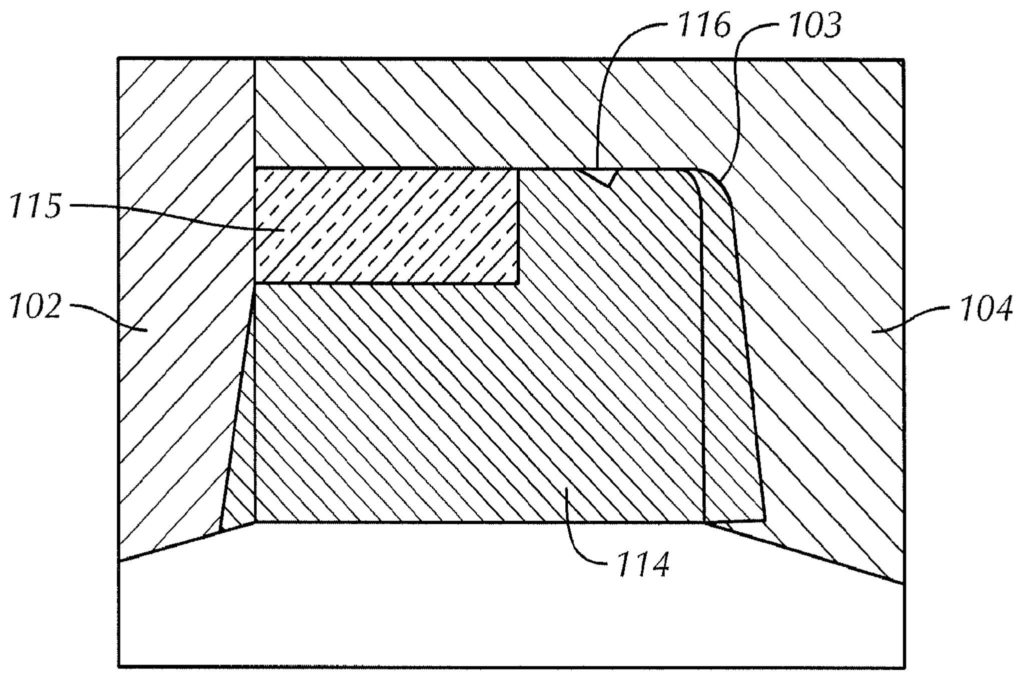
FIG. 7 shows an enlarged cross section view of a seal in accordance with one or more embodiments of the present disclosure.
Figure 8:
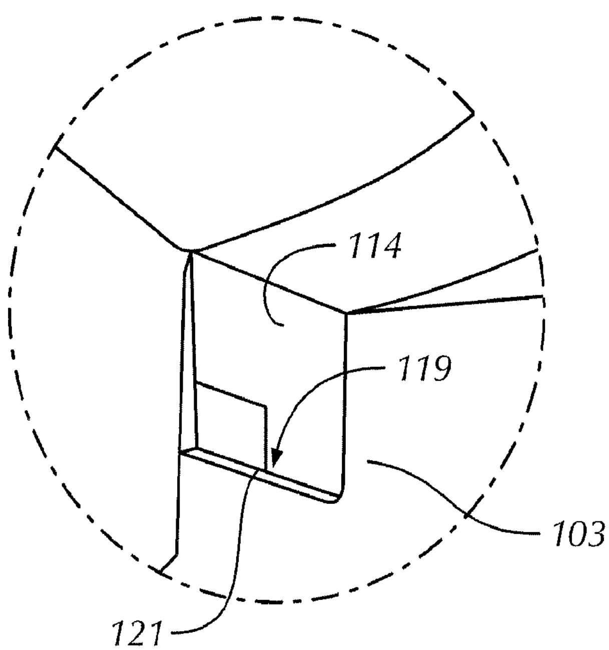
FIG. 8 shows a perspective view of a seal in accordance with one or more embodiments of the present disclosure.

Referring back to FIG. 2A, the hammer union 100 further includes a seal 114 disposed in a pocket 103 formed on an inner surface of the female sub 104 axially proximate the contact surfaces 122, 123. FIGS. 7 and 8 illustrate the seal 114 in greater detail in accordance with one or more embodiments of the present disclosure. The seal 114 includes an anti-extrusion ring 115 to prevent extrusion of the seal material at high pressures. The seal 114 may be an elastomeric seal, or any other type of seal material known to one of ordinary skill in the art.

In addition, the pocket 103 in the female sub 104 may include one or more barbs 116 that protrude radially outward from a circumferential surface of pocket 103. The one or more barbs 116 secure the seal 114 within pocket 103. The barb 116 is configured to "dig" into an outer diameter ("OD") of the elastomeric portion of the seal 114 to retain the seal 114 within seal pocket 103. The barb 116 includes an inclined ramp surface to facilitate installation of the seal 114 within pocket 103 (i.e., the inclined ramp surface allows the seal to slide therealong in one direction without digging into the seal). Further, the reverse side of the barb 116 prevents the seal 114 from falling out of the pocket 103 during assembly and disassembly operations (i.e., the reverse side is a steeper incline or substantially vertical, and digs into the seal surface to prevent the seal from falling from the pocket). A tool may be used, such as a screwdriver, to pry the seal out when the seal needs to be replaced.

In other embodiments, as shown in FIG. 8, a retaining groove 119 may be added to the seal 114 to keep it engaged to a retaining ridge 121 in the seal pocket 103 at all times during assembly and disassembly of the hammer union connection. Engagement of the retaining groove 119 in the seal 114 with the retaining ridge 121 in the seal pocket 103 prevents the seal 114 from falling out of the seal pocket 103.

Methods of assembling the male hammer union end connection include inserting a plurality of load segments

108 between the male sub 102 and the threaded union nut 106 through the load segment port 130. Method of assembling the female sub end connection may be accomplished by inserting seal 114 within pocket 103 of the female sub 104 and retained in the pocket 103 with the barb 116. The barb 116 digs into an elastomeric material of the seal 114 and prevents the seal 114 from falling out of the pocket 103. In other embodiments, a retaining ridge 121 of the seal pocket 103 may engage with a retaining groove 119 in the seal 114 to prevent the seal 114 from falling out of the pocket 103. These assembly steps need only be performed once during product assembly or replacement during maintenance.

During operations, connecting assembly mating male and female sub end connections is then accomplished by threadedly engaging the internal threads 107 of the threaded union nut 106 with the external threads 105 of the threaded female sub 104.

The hammer union 100 is tightened such that abutting ends of the male sub 102 and the female sub 104 are coupled together. Moreover, flat contact surface 120 of the male sub and flat contact surface 122 of the female sub engage face to face. The increased contact surface diameter provided by contact surfaces 120 and 122 of the hammer union 100, having an outer diameter that is equidistant with a minor thread diameter of external threads 105, provides additional fatigue resistance from cyclic external bending loads.

The diameter of the seal pocket 103 is also reduced compared to existing hammer union connections. As a result, hydrostatic end load is reduced and cross-section area is added back to the female sub 104, thereby increasing its strength.

Embodiments disclosed herein provide a hammer union including a male sub, a threaded female sub, and a threaded union nut disposed around abutting ends of the threaded female sub and the male sub, wherein the abutting ends of the threaded female sub and the male sub include contact surfaces perpendicular to a longitudinal axis of the hammer union, and wherein an outermost diameter of the perpendicular contact surfaces and a minor thread diameter of the female sub are equidistant from a longitudinal axis of the hammer union.

Further, embodiments disclosed herein provide a method of assembling a hammer union including inserting one or more load segments between a threaded union nut and a male sub, threadedly engaging internal threads of the threaded union nut with external threads of a female sub, and engaging flat contact surfaces of abutting ends of the male sub and the female sub, wherein an outermost diameter of the flat contact surfaces and a minor thread diameter of the external threads of the female sub are equidistant from a longitudinal axis of the hammer union.

Advantageously, embodiments of the present disclosure may provide a hammer union with the following: a marker on the threaded union nut acts as a visual aid that helps align the thread starts of the threaded union nut and the female sub during make-up; when the hammer union is made up, the female sub face contacts the male sub at an outermost flat diameter surface to reduce bending stresses at the thread root due to make-up load and cyclic external bending loads; and a seal with an anti-extrusion ring is used along with a barbed seal pocket in the female sub, which retains the seal without damaging it while under pressure.

Further, any male sub and nut assembly employing embodiments of the present disclosure are able to mate and function with existing female sub end connections of the same nominal size and pressure rating that do not employ the embodiments in the present disclosure. Conversely, any female sub assembly employing the embodiments of the present disclosure are able to mate and function with existing male sub and nut end connections of the same size and pressure rating that do not employ embodiments of the present disclosure. Therefore, a male sub with nut assembly and a female sub in accordance with embodiments disclosed herein are compatible with a conventional female sub and a conventional male sub with nut assembly, respectively.

Further advantages of embodiments of the present disclosure include a hammer union having reinforcement flutes to give protection and strength to the load segment port; in embodiments in which the load segment grooves are shortened in the threaded union nut and lengthened in the male sub, the length of the threaded union nut may be shortened and weight of the connection reduced; cross-sectional areas of the threaded union nut, female sub, and male sub are increased in places where fatigue cracks occur; thread length of the female sub and threaded union are increased, which results in increased thread engagement and lowers the hammer union connection's thread shear stress and bending stresses and increases resistance to fatigue; the hammer union includes removable plugs that are easy to insert but difficult to remove to keep the load segments in place; removable load segments increase the male load shoulder shear area and reduces contact stress area of the connection; and load segment grooves have small clearances to prevent sand and other fine grained debris from clogging up the groove where the load segments sit, and a ramp up is present to allow for easy installation during makeup but to have a solid connection that allows for loads to be evenly distributed. Finally, hammer unions in accordance with one or more embodiments disclosed herein are fully compatible with previous hammer unions.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A hammer union comprising:

a male sub;

a threaded female sub;

a threaded union nut disposed around abutting ends of the threaded female sub and the male sub;

wherein the abutting end of the threaded female sub comprises:

an outer contact surface substantially perpendicular to a longitudinal axis of the threaded female sub, an outermost diameter of the outer contact surface being equidistant as a minor thread diameter of the threaded female sub from the longitudinal axis of the threaded female sub;

an inner contact surface substantially perpendicular to the longitudinal axis of the threaded female sub and having a different axial location along the longitudinal axis of the threaded female sub than the outer contact surface;

an intermediate contact surface between the outer contact surface and the inner contact surface, the intermediate contact surface having at least a portion that is both non-parallel and non-perpendicular to the longitudinal axis of the threaded female sub; and a seal pocket formed on an inner surface of the threaded female sub radially inwardly adjacent the inner contact surface; and wherein the abutting end of the male sub comprises a complementary contact surface configured to be in contact with at least one of the outer contact surface and the intermediate contact surface of the threaded female sub.

2. The hammer union of claim 1, further comprising a marker on the threaded union nut which acts as a visual aid to align thread starts of the threaded union nut and the threaded female sub.

3. The hammer union of claim 2, wherein the marker includes a through-hole extending from an inner surface of the threaded union nut to an outer surface of the threaded union nut or a notch, the through-hole configured to allow a user to see that external threads of the threaded female sub are being engaged by internal threads of the threaded union nut.

4. The hammer union of claim 1, further comprising a seal disposed within the seal pocket, wherein an end surface of the male sub contacts the seal.

5. The hammer union of claim 4, wherein the seal further comprises an anti-extrusion ring disposed proximate abutting ends of the threaded female sub and the male sub.

6. The hammer union of claim 4, wherein the seal pocket includes a barb configured to engage an outer diameter of the seal and retain the seal within the seal pocket.

7. The hammer union of claim 4, wherein the seal pocket includes a retaining ridge configured to engage a retaining groove in an outer diameter of the seal and retain the seal within the seal pocket.

8. The hammer union of claim 1, further comprising a plurality of load segments radially disposed between the male sub and the threaded union nut.

9. The hammer union of claim 8, further comprising load segment grooves in the male sub and the threaded union nut in which the one or more load segments are disposed.

10. The hammer union of claim 9, wherein the one or more load segments are removable from the load segment grooves.

11. The hammer union of claim 10, further comprising a port in the threaded union nut through which the removable load segments are inserted between the threaded union nut and the male sub.

12. The hammer union of claim 11, further comprising a plug which is inserted into the port of the threaded union nut.

13. A method of assembling a hammer union, the method comprising:

inserting a plurality of load segments between a threaded union nut and a male sub;

threadedly engaging internal threads of the threaded union nut with external threads of a female sub; and engaging contact surfaces of the male sub with contact surfaces of the female sub, wherein the contact surfaces of the female sub include an outer contact surface, an inner contact surface, and an intermediate contact surface, wherein the outer contact surface is substantially perpendicular to a longitudinal axis of the threaded female sub, an outermost diameter of the outer contact surface being equidistant as a minor thread diameter of the threaded female sub from the longitudinal axis of the threaded female sub, wherein the inner contact surface is substantially perpendicular to the longitudinal axis of the threaded female sub and having a different axial location along the longitudinal axis of the threaded female sub than the outer contact surface; and wherein the intermediate contact surface comprises at least a portion that is both non-parallel and non-perpendicular to the longitudinal axis of the threaded female sub, wherein the contact surfaces of the male sub are configured to be in contact with at least one of the outer contact surface and the intermediate contact surface of the threaded female sub, and engaging an end face of the male sub with a seal disposed in a seal pocket formed on an inner surface of the threaded female sub radially inwardly adjacent the inner contact surface.

14. The method of claim 13, further comprising engaging an outer diameter of the seal with a barb protruding from a circumferential surface of the pocket to retain the seal within the pocket of the female sub.

15. The method of claim 13, further comprising engaging a retaining groove in an outer diameter of the seal with a retaining ridge in the seal pocket to retain the seal within the pocket of the female sub.

16. The method of claim 13, further comprising providing an anti-extrusion ring with the seal.

17. The method of claim 13, wherein the female sub is configured to mate and function with a male sub and a threaded union nut of a conventional hammer union having the same nominal size and pressure rating as the female sub.

18. The method of claim 13, further comprising visually aligning thread starts of the internal threads of the threaded union nut with the external threads of the female sub.

19. The method of claim 18, wherein the male sub and threaded union nut are configured to mate and function with a female sub of a conventional hammer union having the same nominal size and pressure rating as the male sub and threaded union nut.

20. The method of claim 13, further comprising inserting the plurality of load segments through a port in the threaded union nut.

21. The method of claim 20, further comprising inserting a plug into the port after the load segments are inserted.

* * * * *